US006831266B2

(12) United States Patent
Paritsky et al.

(10) Patent No.: US 6,831,266 B2
(45) Date of Patent: Dec. 14, 2004

(54) OPTICAL TRANSDUCERS OF HIGH SENSITIVITY

(75) Inventors: Alexander Paritsky, Modi'in (IL); Alexander Kots, Ashdod (IL)

(73) Assignee: Phone-Or Ltd., Or Yehuda (IL)

( * ) Notice: Subject to any disclaimer, the term of this patent is extended or adjusted under 35 U.S.C. 154(b) by 0 days.

(21) Appl. No.: 10/097,557

(22) Filed: Mar. 13, 2002

(65) Prior Publication Data

US 2003/0173507 A1 Sep. 18, 2003

(51) Int. Cl.[7] .............................. G01J 1/04; G01J 1/42; G01J 5/08

(52) U.S. Cl. .................. 250/227.14; 250/553; 250/221

(58) Field of Search ....................... 250/227.14, 227.11, 250/553, 214.1, 221; 356/373, 372, 375

(56) References Cited

U.S. PATENT DOCUMENTS 5,771,091 A 6/1998 Paritsky et al.
5,969,838 A * 10/1999 Paritsky et al. ............. 398/136
6,091,497 A 7/2000 Paritsky et al.
6,239,865 B1 5/2001 Paritsky et al.

* cited by examiner

*Primary Examiner*—Thanh X. Luu
*Assistant Examiner*—Seung C. Sohn
(74) *Attorney, Agent, or Firm*—G.E. Ehrlich (1995) Ltd.

(57) ABSTRACT

An optical transducer includes a base member, a light source carried on a face of the base member, a light detector carried on the face of the base member, a displaceable member overlying and spaced from the light source and light detector and effective to reflect light from the light source to the light detector, and light shielding means effective to shield the light detector from exposure to the light source except for the light reflected by the displaceable member from the light source to the light detector. The light detector is configured to substantially surround the light source such as to receive light emitted in substantially all directions from the light source for reflection to the light detector by the displaceable member.

11 Claims, 4 Drawing Sheets

OPTICAL TRANSDUCERS OF HIGH SENSITIVITY

FIELD AND BACKGROUND OF THE INVENTION

The present invention relates to optical transducers (sometimes referred to as optical sensors,) which utilize optical means for sensing mechanical displacements, such as movements of a body or deformation of a membrane, and converting them to electrical signals. The invention also relates to methods of making such optical transducers. The invention is particularly useful in making optical microphones for converting sound into electrical signals and is therefore described below especially with respect to this application.

Optical transducers of this type are described, for example, in U.S. Pat. Nos. 5,771,091; 5,969,838; 6,091,497; and 6,239,865, the contents of which patents are incorporated herein by reference.

Such optical transducers generally include an optical unit containing a light source, a laterally spaced light detector, an optical shield between the light source and light detector, and a displaceable member aligned with the optical window defined by the light source, light detector, and optical shield between them. The displaceable members in the optical transducers described in the above patents are generally in the form of deformable membranes, but may be physically movable members, such as in an accelerometer. Optical transducers of this type can be constructed to be very accurate for measuring very small displacements.

In general, such optical transducers provide only one light detector spaced laterally of the light source, or two light detectors on the opposite sides of the light source, and therefore utilize only a part of the light produced by the light source for sensing movement of the membrane. This limits the sensitivity of the optical transducer for detecting or measuring displacements of the membrane.

BRIEF SUMMARY OF THE PRESENT INVENTION

An object of the present invention is to provide an optical transducer which utilizes substantially more of the light generated by the light source within it, and thereby is capable of providing increased sensitivity.

According to one aspect of the present invention, there is provided an optical transducer, comprising: a base member; a light source carried on a face of the base member; a light detector carried on the face of the base member; a displaceable member overlying and spaced from the light source and light detector and effective to reflect light from the light source to the light detector; and light shielding means effective to shield the light detector from exposure to the light source except for the light reflected by the displaceable member from the light source to the light detector; the light detector being configured to substantially surround all sides of the light source such as to receive light emitted in substantially all directions from the light source for reflection to the light detector by the displaceable member.

As will be described more particularly below, such an optical transducer utilizes a substantially higher percentage of the light generated by the light source within it, and therefore is capable of providing higher sensitivity.

Several preferred embodiments of the invention are described below for purposes of example. In all the described embodiments, the light source and light-blocking layer, and in most cases also the light detector elements, are embedded in a transparent plastic potting material. The outer surface of the transparent plastic potting material includes a light-blocking layer to block the exit of light from the light source externally of the optical transducer, and to block the entry of external light into the optical transducer.

In one described preferred embodiment, the light detector includes an array of at least four discrete light detector elements located on four sides of the light source so as to substantially surround the light source. The light shielding means in this embodiment includes a light-blocking layer around the light source such as to shield all the light detector elements from the light source except for the light reflected by the displaceable member.

A second embodiment of the invention is described below wherein the light detector is of annular configuration surrounding the light source with the light source centrally thereof. More particularly, the light detector of annular configuration is carried on a semiconductor wafer which wafer is carried on the common base. The semiconductor wafer is formed with a central opening for accommodating the light source. The light shielding means includes a light-blocking layer on the surface of the semiconductor wafer defining the central opening.

Further embodiments of the invention are described below wherein the light source includes a plurality of discrete light-generating elements carried on a face of the light detector. The light detector include surfaces in the spaces between the discrete light-generating elements and the light shielding means includes a light blocking layer around each of the discrete light-generating elements such as to shield the light detector surfaces from all the discrete light-generating elements except for the light reflected by the displaceable member.

In the described preferred embodiments, the plurality of discrete light-generating elements are carried in the form of a matrix on a face of the light detector. In one described embodiment, the discrete light-generating elements are in abutting relation to each other in the matrix; and in another described embodiment, they are in spaced relation to each other, being deposited in a honeycomb of boxes formed in the light detector.

As will be described below, optical transducers can be constructed in accordance with the foregoing features to provide relatively high sensitivity to displacements of the displaceable member (e.g., deformations of the deformable membrane) as well as high degree of sturdiness enabling such optical transducers to withstand rough handling.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PRIOR ART CONSTRUCTION (FIG. 1)

Figure 1:
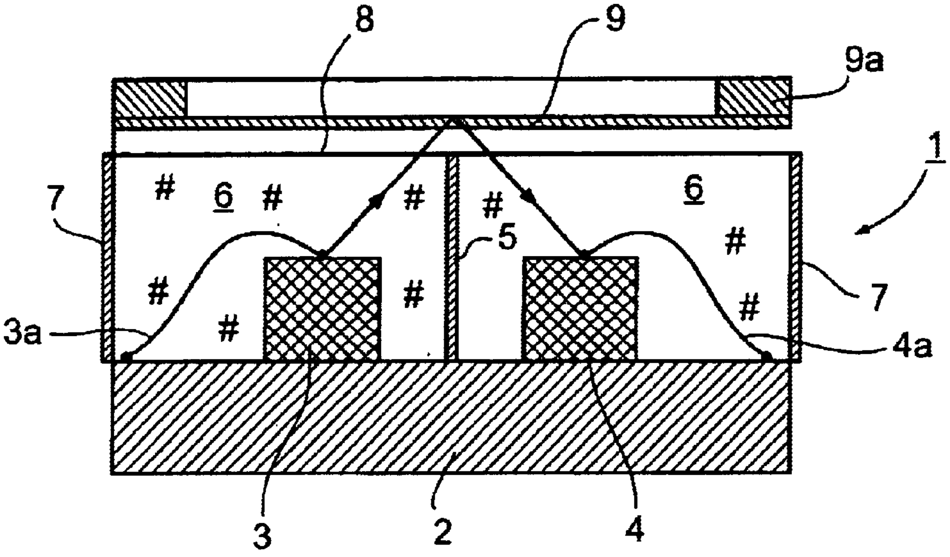
Fig. 1 (Prior Art)
FIG. 1 is a sectional view illustrating one form of optical transducer constructed in accordance with the prior art.

The prior art optical transducer schematically illustrated in FIG. 1 includes a base member 2 mounting a light source 3 and a light detector 4 in spaced side-by-side relation. The light source 3 and light detector 4 are optically shielded from each other by a light-blocking member 5, all embedded within a transparent plastic potting material 6.

The outer surface of the transparent plastic potting material 6 carries an external light shielding layer 7, e.g., of a light-reflecting material, such as a film of aluminum or gold, except for the outer face 8 of the transparent plastic potting material 6 overlying the light source 3, light detector 4, and the optical shield 5 between them. The outer face 8 defines an optical window. External light shielding layer 7 optically isolates the light detector 4 from light in the external environment, as well as blocking the passage of light from light source 3 to the external environment.

A displaceable member, in the form of a deformable membrane 9, is mounted by a mounting ring 9*a* in optical window 8 to overlie the light source 3, the light detector 4, and the light-blocking member 5 embedded in the transparent plastic potting material 6. The surface of membrane 9 facing the optical window 8 is made light-reflecting, so as to reflect the light from the light source 3 back to the light detector 4. It will be appreciated that the light is emitted from light source 3 in all directions and is refracted at the interface between the plastic body 6 and the air gap to the membrane 9, such that a substantial amount of the emitted light impinges membrane 9 at an angle, and is thereby reflected back to the light detector 4, as indicated by the arrows in FIG. 1.

The common base may be a printed circuit board (PCB) carrying the electrical connections 3*a*, 4*a* to the light source 3 and light detector 4, respectively. Light source 3 may be any suitable light source, such as a light-emitting diode (LED), and light detector 4 may be any suitable light detector, such as a photo diode. Membrane 9 may be any other displaceable body effective to reflect light from light source 3 to light detector 4 in accordance with its changing position or changing configuration. Light-blocking member 5 may carry a light-reflecting coating similar to layer 7.

It will be seen that the light sources 3 and the light detector 4 are optically isolated from each other and from the external environment on all surfaces thereof except for the optical window 8 receiving the membrane 9. Thus, the light from light source 3 is reflected from the inner surface of the membrane 9 towards the light detector 4, such that any displacement of the membrane will change the intensity of the light received by the light detector. Accordingly, the light received by the light detector 4 is converted to an electrical signal corresponding to the deformations of membrane 9 and output via electrical connection 4*a*.

As described in the above-cited patents, optical transducers as illustrated in FIG. 1 are usable in a wide variety of applications involving the detection or measurement of micro-movements or macro-movements, such as in the construction of microphones, hydrophones, accelerometers, pressure/vacuum gauges, temperature sensors, displacement meters, etc.

As indicated earlier, one of the drawbacks of the prior art optical transducer illustrated in FIG. 1 is that it utilizes a relatively small part of the light generated by the light source 3, and therefore has relatively low sensitivity. The present invention improves the optical transducers particularly in this respect.

DESCRIPTION OF PREFERRED EMBODIMENTS OF THE PRESENT INVENTION

Figure 2:
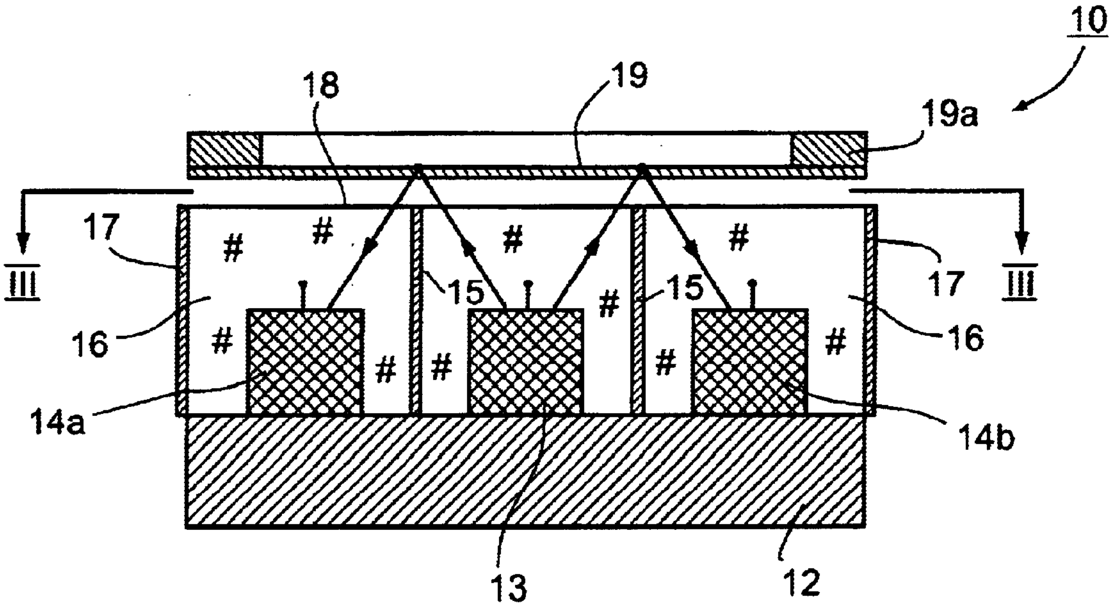
FIG. 2 is a sectional view schematically illustrating one form of optical transducer constructed in accordance with the present invention.
Figure 3:
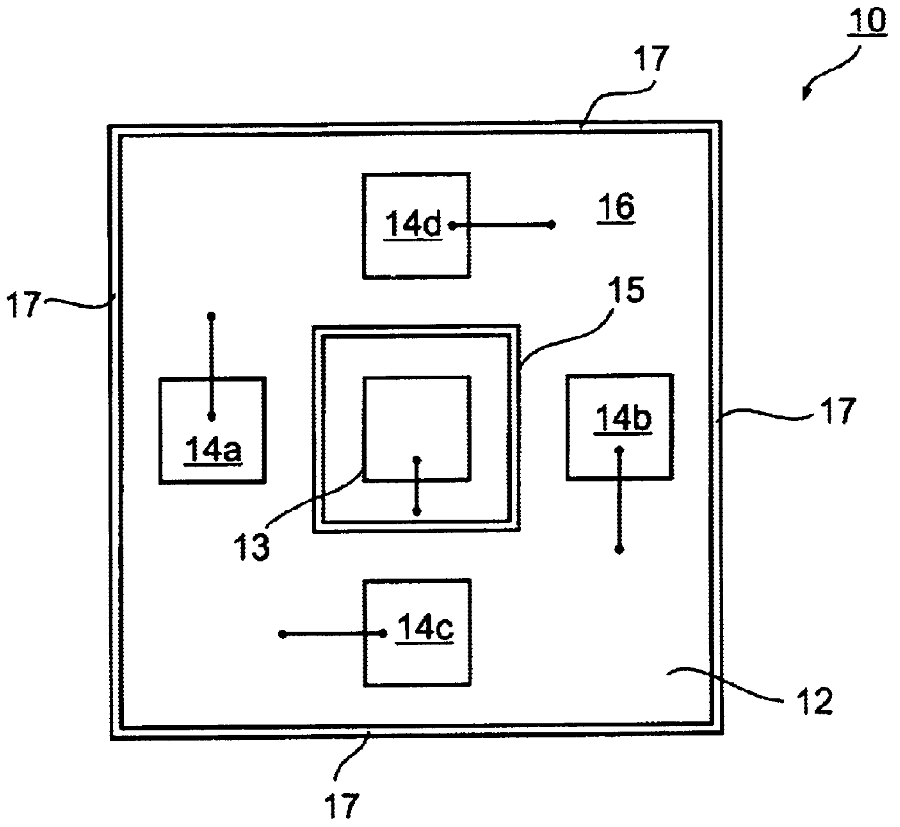
FIG. 3 is a plan view along line III—III of FIG. 2.

The optical transducer illustrated in FIGS. 2 and 3, and therein generally designated 10, includes a base member in the form of a printed circuit board (PCB) 12, carrying on one face a light source 13 and a light detector in the form of an array of four discrete light detector elements 14*a*–14*d* located on all four sides of the light source 13 so as to substantially surround the light source. The illustrated optical transducer further includes light shielding means in the form of a light-blocking layer 15 around the light source 13 such as to shield all the light detector elements 14*a*–14*d* from direct exposure to the light source 13. The light source 13, light detector elements 14*a*–14*d*, and light-blocking layer 15, are all embedded in a transparent plastic potting material 16. The outer surface of the transparent plastic potting material 16 includes a light-blocking layer 17 to block the exit of light from the light source 13 externally of the optical transducer, and also to block the entry of external light into the optical transducer.

Preferably, the light-blocking layers 15 and 17 are both of a light-reflecting material, such as a coating of aluminum or gold. These light-blocking coatings may be provided by first embedding the light source 13 with the transparent plastic potting material 16, applying the light-reflecting coating 15 on the outer face thereof, then embedding the discrete light detector elements 14*a*–14*d* with the transparent plastic potting material 16, and then applying the light-reflecting coating 17 on the outer surface of the transparent plastic potting material except for that to serve as the optical window 18 as shown in FIG. 2.

A displaceable member, in the form of a deformable membrane 19, is mounted by means of a mounting ring 19*a* to the outer face of the block of transparent plastic potting material 16 such that the membrane is aligned with the optical window 18 and spaced from the outer face of the transparent plastic potting material so as to be deformable towards and away therefrom, e.g., by acoustical waves picked-up by the optical transducer.

It will thus be seen that the optical transducer 10 illustrated in FIGS. 2 and 3 will be effective to vary the light from the light source 13 received by all the light detector elements 14*a*–14*d* in response to the deformations of the membrane 17, and thereby convert the deformations of the membrane to electrical signals. Since the four light detector elements 14*a*–14*d* receive the light emitted from the light source 13 in substantially all directions from the light source and reflected by the membrane 19, this will increase the overall sensitivity of the optical transducer, as compared, for example, to the conventional prior art construction illustrated in FIG. 1.

In the construction illustrated in FIGS. 2 and 3, the light source 13 is of square configuration, and therefore the light-blocking layer 15 around the light source is also of square configuration. It will be appreciated, however, that the light source 13 could be of a circular or other configuration, in which case the light-blocking layer 15 would be of the same configuration. In the construction illustrated in FIGS. 2 and 3, the discrete light-detector elements 14*a*–14*d* are also shown as of a square configuration, but these elements could also be of a circular or other configuration.

Preferably, the light source 13 is a light-emitting diode (LED), and the light sources 14*a*–14*d* are photo-conductive elements, all carried on the base member 12. Preferably the base member 12 is a printed circuit board (PCB) which includes the electrical connections to the light source 13 and the light detector elements 14*a*–14*d*.

Figure 4:
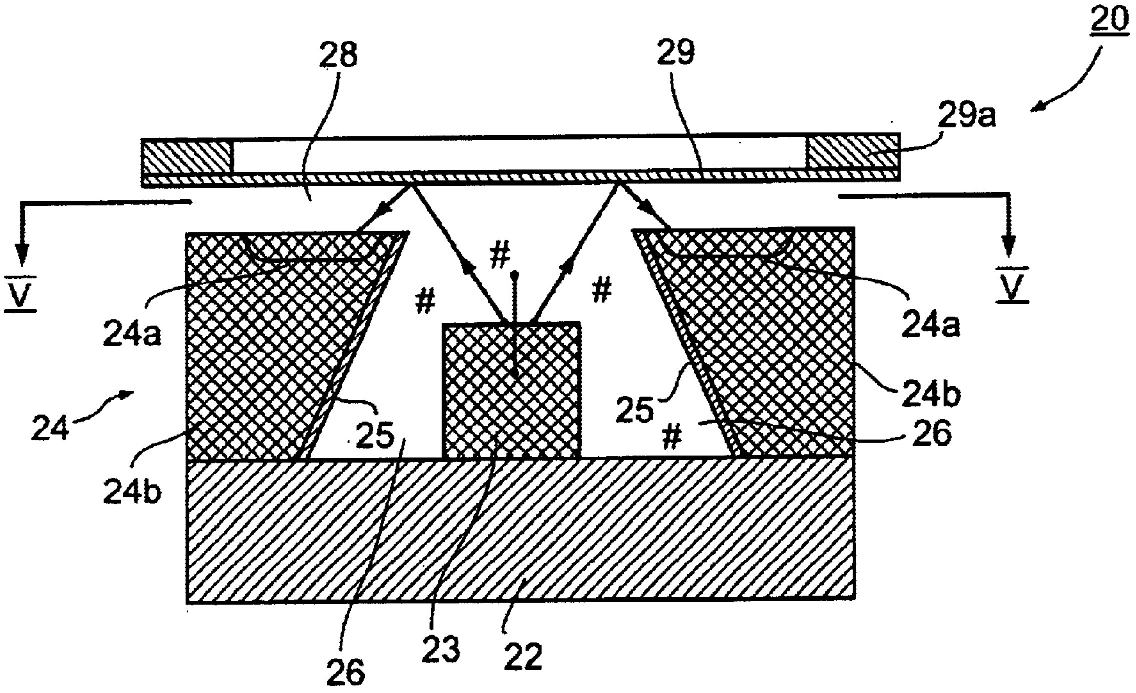
FIG. 4 is a sectional view schematically illustrating a second form of optical transducer constructed in accordance with the present invention.
Figure 5:
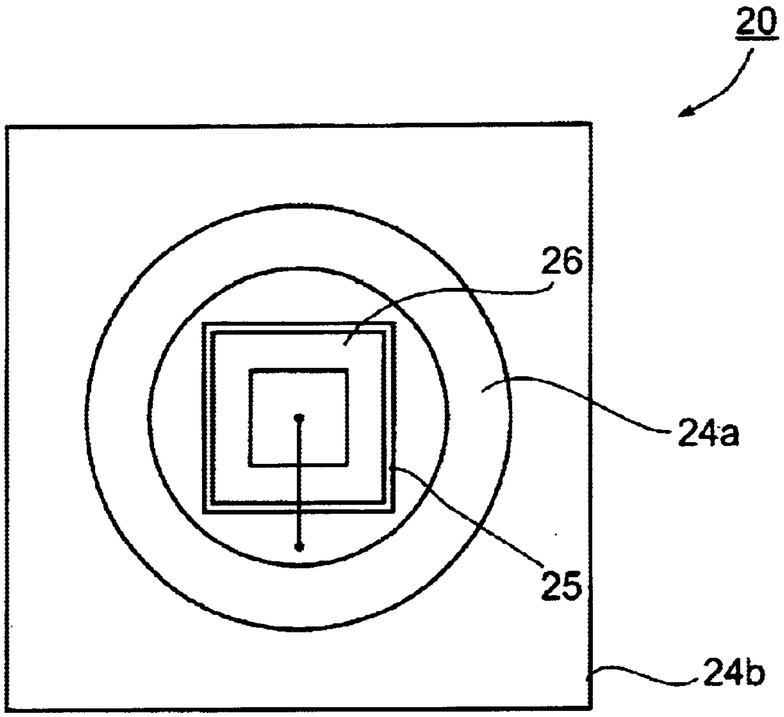
FIG. 5 is a plan view along line V—V of FIG. 4.

FIGS. 4 and 5 illustrate an optical transducer, therein generally designated 20, in which the light detector is of annular configuration surrounding the light source with the light source located centrally of the light detector.

Thus, as shown particularly in FIG. 4 the optical transducer 20 includes a base member 22, also preferably a printed circuit board (PCB), carrying a light source 23 and a light detector, generally designated 24, of annular configuration surrounding the light sources 23. The light detector 24 is constituted of an annular layer 24*a* of a light sensitive material carried on the upper face of an annular semiconductor wafer 24*b* formed with a central opening for accommodating the light source 23. The inner surface of the opening in the semiconductor wafer 24*b* facing the light source 23 carries a light shielding layer 25 for shielding the light sensitive material 24*a* from direct exposure to the light from light source 23. As seen particularly in FIG. 4, this inner surface of the semiconductor wafer 24*b*, and thereby the light shielding layer 25 carried on it, decrease in transverse dimension from the PCB 22 in the outward direction such that the semiconductor wafer defining the central opening receiving the light source 23 converges in the outward direction with respect to the PCB.

A body of a transparent plastic potting material 26 is introduced into the central opening in the semiconductor wafer 24*b* so as to embed the light source 23 as well as the light shielding layer 25 within this transparent plastic potting material.

The deformable membrane 29 is then mounted by means of the mounting ring 29 to the semiconductor wafer 24*b* so as to be spaced therefrom and to define the optical window 28 (FIG. 4) of the transducer. Membrane 29 will thus be effective to reflect the light from the light source 23 towards the annular light-sensitive material 24*a* of the detector 24, and thereby to vary the intensity of the light received by the light detector 24 in response to the deformations of the membrane.

It will be seen that, because of the annular configuration of the light detector 24, it receives light emitted in substantially all directions from the light source 23 and reflected to it by the deformable membrane 27, thereby increasing the sensitivity of the optical transducer. It will also be seen that the described construction, particularly the provision of the transparent plastic potting material 26, which embeds the light source 23 and the light shielding layer 25, produces a very sturdy construction which is capable of withstanding rough handling.

As one example, the semiconductor wafer carrier 24*b* of the light detector 24 may be a silicon wafer; the central opening in the wafer may be made by the standard process of anisotropic wet etching silicon wafers; the light shielding layer 25 may be a light-reflecting coating, such of aluminum or gold; the light source 23 may be an LED; the light-sensitive material 24*a* of light detector 24 may be a photo diode applied to or formed in the outer surface of the silicon wafer 24; and the transparent plastic potting material 26 may be an epoxy resin.

Figure 6:
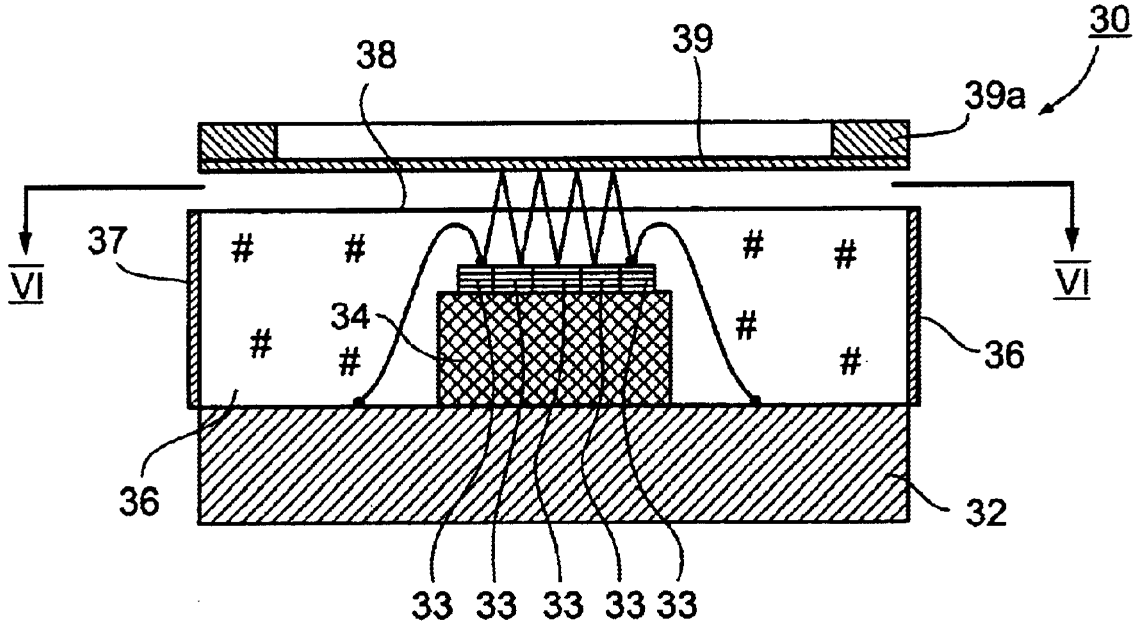
FIG. 6 is a sectional view schematically illustrating a third form of optical transducer constructed in accordance with the present invention.
Figure 7:
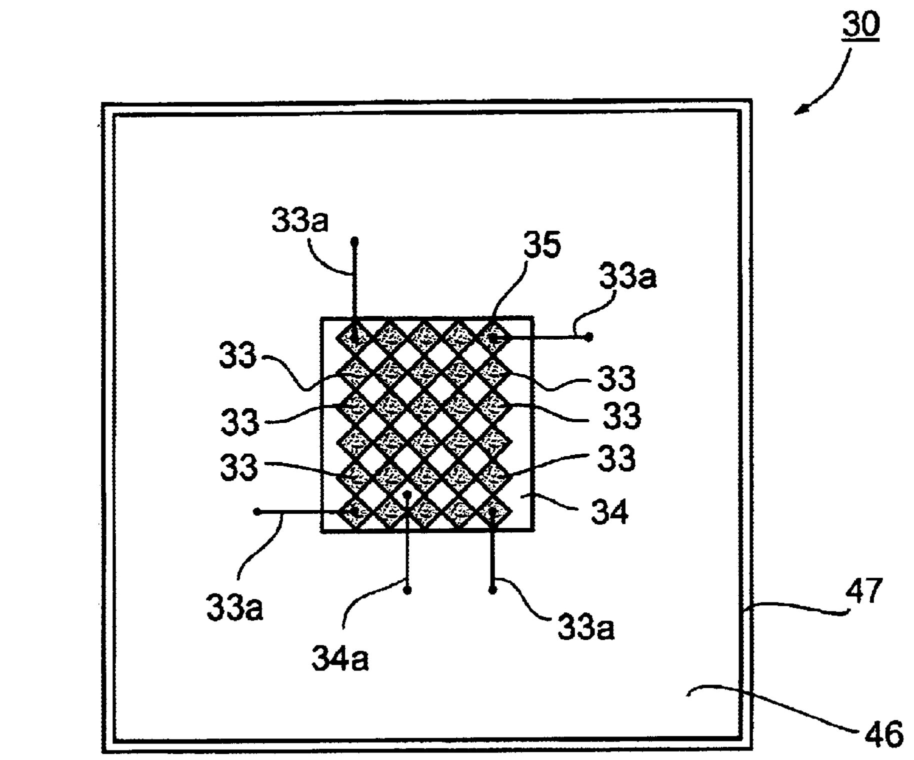
FIG. 7 is a plan view along line VII—VII of FIG. 6.

FIGS. 6 and 7 illustrate an optical transducer, therein generally designated 30, wherein the light source includes a plurality of discrete light-generating elements carried on a face of the light detector, such that the light detector provides surfaces between the discrete light-generating elements which substantially surround those elements in order to receive light emitted from those elements in substantially all directions, to thereby increase the sensitivity of the transducer.

Thus, as shown in FIGS. 6 and 7, the optical transducer 30 illustrated therein includes a base member 32, also in the form of a printed circuit board (PCB), carrying on a face thereof a body 34 of a light detector material. The outer face of the light detector body 34 (i.e., that facing away from the PCB 32,) carries a plurality of discrete light-generating elements 33 arranged in a rectangular matrix, as shown particularly in FIG. 7. Each of the light-generating elements 33 is coated with a light shielding material 35 on all surfaces except those facing outwardly, i.e., facing the optical window 38 and away from the PCB 32. A transparent plastic potting material 36 is then applied to embed the light detector body 34, as well as the light-generating elements 33 and their light-shielding coatings 35; and another light-shielding coating 37 is applied to the outer surface of the transparent plastic potting material 35 except for that defining the optical window 38.

The deformable membrane 39 is then mounted by mounting ring 39*a* spaced from the outer face of the transparent plastic potting material 36 defining the optical window 38, such that the deformable membrane 39 reflects the light from the light-generating elements 33 towards the light detector 34, and modulates the intensity of the light so received by the light detector in accordance with the deformations of the membrane. The light-generating elements 33 may be energized by electrical connections 33*a* formed in the PCB 32, and the electrical signal generated by the light detector 34 may be outputted by electrical connection 34*a* also formed in the PCB.

The light detector body 34 may be completely made of a light sensitive material, such as a photodiode material, or may be a semiconductor wafer having its upper surface facing the deformable membrane 7 formed of the light detecting material. The light generating elements 33 may be organic light emitting diodes (OLEDs) formed on or applied to the outer face of the light detector body 34. The light shielding layers 35 around the light generating elements 33 may be of light-reflecting material, such as aluminum or gold coatings, effectively shielding the light detector 34 from direct exposure to the light generated by the light-generating elements 33 except the light reflected from the deformable membrane 39.

FIG. 7 illustrates, for purposes of example, the light detector body 34 as being of a rectangular configuration, and the light generating elements 33 also as being of a rectangular configuration and arranged in a rectangular matrix on the light detector body 34. It will be appreciated, however, that the light detector body 34, and/or the light generating elements 33, can be of a circular or other configuration.

The light generating elements 33 should be arrayed so as to expose a substantial surface of the light detector body 34 to the light reflected from the deformable membrane 39.

Thus, as shown in FIG. 7, the light detector 34 includes surfaces which not only substantially surround each of the light generating elements 33, but also in the interstices between those elements. This enables the light detector 34 to receive light emitted from the light-generating elements 33 in all directions and reflected by the deformable membrane 39, to provide high sensitivity, whereas the embedding these elements in the transparent plastic potting material 36 provides a sturdy construction capable of withstanding rough handling.

Figure 8:
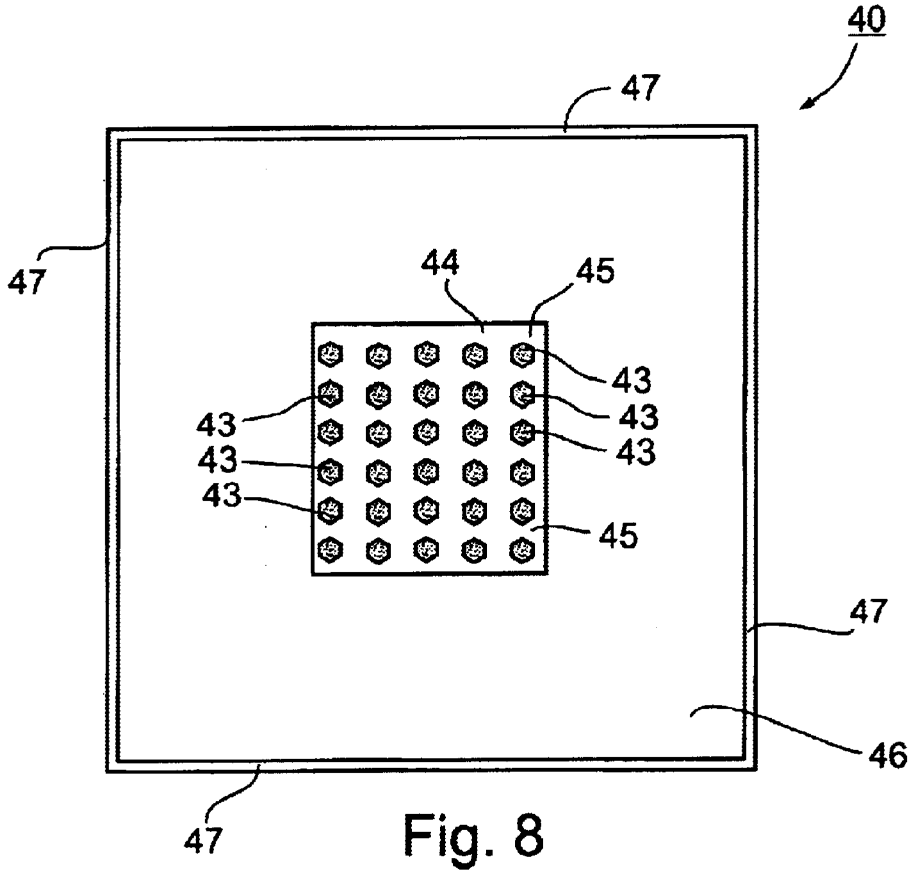
FIG. 8 is a view corresponding to that of FIG. 7 but illustrating a fourth form of optical transducer constructed in accordance with the present invention.

FIG. 8 illustrates an optical transducer, therein generally designated 40, of a similar construction as that illustrated in FIGS. 6 and 7. In this case, however, the light detector body 44 is covered by a honeycomb matrix of discrete light generating elements 43 covering the light detector surface. Such a construction may be produced, for example, by selectively coating the surface of said light detector 44 with the light shielding coating 45, such as of a light-reflecting metal, and then depositing on this shielding coating the organic light-generating elements 43, e.g., of OLED or a fluorescent material.

The construction illustrated in FIG. 8 may otherwise be the same as described above, particularly with respect to FIGS. 6 and 7, to include the transparent plastic potting material 46 embedding the foregoing optical elements, and the outer light shielding layer 47 for blocking the exit of light from the light generating elements 33 externally of the transducer, and the entry of external light into the transducer.

While the invention has been described with respect to several preferred embodiments, it will be appreciated that these are set forth merely for purposes of example, and that many other variations, modifications and applications of the invention will be apparent to those skilled in the art.

What is claimed is:

1. An optical transducer, comprising:

a base member;

a light source carried on a face of said base member;

a light detector carried on said face of the base member;

a displaceable member overlying and spaced from said light source and light detector and effective to reflect light from said light source to said light detector; and a light shielding means effective to shield said light detector from exposure to said light source except for the light reflected by said displaceable member from the light source to the light detector;

wherein said light detector is configured to substantially surround all sides of said light source such as to receive light emitted in substantially all directions from said light source for reflection to the light detector by said displaceable member;

wherein said light source includes a plurality of discrete light-generating elements carried on a face of said light detector;

said light detector including surfaces in the spaces between said discrete light-generating elements;

said light shielding means including a light blocking layer around each of said discrete light-generating elements such as to shield said light detector surfaces from all said discrete light-generating elements except for the light reflected by said displaceable member.

2. The optical transducer according to claim 1, wherein said plurality of discrete light-generating elements are carried in the form of a matrix on the face of said light detector.

3. The optical transducer according to claim 2, wherein said discrete light-generating elements are organic light emitting diodes.

4. The optical transducer according to claim 2, wherein said discrete light-generating elements are in abutting relation to each other in said matrix.

5. The optical transducer according to claim 2, wherein said discrete light-generating elements are in spaced relation to each other in said matrix.

6. The optical transducer according to claim 3, wherein said discrete light-generating elements are deposited in the form of a matrix on the surface of said light detector.

7. The optical transducer according to claim 1, wherein said discrete light-generating elements, said light-blocking layers, and said light detector are all embedded in a transparent plastic potting material.

8. The optical transducer according to claim 7, wherein the outer surface of said transparent plastic potting material includes a light-blocking layer to block the exit of light from the light source externally of the optical transducer, and to block the entry of external light into the optical transducer.

9. The optical transducer according to claim 1, wherein said displaceable member is a membrane deformable towards and away from said light and light detector.

10. The optical transducer according to claim 1, wherein said base member is a printed circuit board having electrical connections to said light source and light detector.

11. The optical transducer according to claim 1, wherein said light detector is covered by a honeycomb structure of light-blocking films defining a plurality of discrete light-generating elements located on said honeycomb structure.

* * * * *